(12) United States Patent
Bouma et al.

(10) Patent No.: US 6,830,735 B1
(45) Date of Patent: Dec. 14, 2004

(54) SEPARATOR APPARATUS

(75) Inventors: Jacob Hendrik Bouma, Enschede (NL); Hubertus Wilhelmus Albertus Dries, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/831,076

(22) PCT Filed: Nov. 4, 1999

(86) PCT No.: PCT/EP99/08900
§ 371 (c)(1),
(2), (4) Date: May 3, 2001

(87) PCT Pub. No.: WO00/27538
PCT Pub. Date: May 18, 2000

(30) Foreign Application Priority Data

Nov. 6, 1998 (EP) .............................. 98203745

(51) Int. Cl.[7] .............................................. B01D 50/00
(52) U.S. Cl. ..................... 422/171; 422/168
(58) Field of Search ................ 422/171, 170, 422/169, 168

(56) References Cited

U.S. PATENT DOCUMENTS

| | | | | |
|---|---|---|---|---|
| 3,353,925 A | * | 11/1967 | Baumann et al. | 422/214 |
| 4,446,107 A | | 5/1984 | Buyan et al. | 422/107 |
| 4,871,514 A | | 10/1989 | Ross | 422/145 |
| 4,997,800 A | * | 3/1991 | Child | 502/42 |
| 5,286,281 A | * | 2/1994 | Bartholic | 95/271 |
| 5,290,431 A | * | 3/1994 | Cunningham | 208/164 |
| 5,372,707 A | * | 12/1994 | Buchanan et al. | 208/161 |

FOREIGN PATENT DOCUMENTS

GB  1.194.366  6/1970  .............. B01J/9/18

* cited by examiner

Primary Examiner—M. Alexandra Elve
(74) Attorney, Agent, or Firm—Charles W. Stewart

(57) ABSTRACT

A cyclone separator apparatus for separating solids from a gas-solid containing feed resulting in a gas-rich stream, the cyclone separator comprising an upright hollow circular housing (1) fluidly connected to a dipleg (8) having at its lower end a flapper valve (14), wherein the dipleg (8) has a lower part (11), which lower part has a diameter which continuously increases from the top (12) of the lower part (11) to the lower end (13) of the dipleg.

7 Claims, 1 Drawing Sheet

SEPARATOR APPARATUS

FIELD OF THE INVENTION

The invention is directed to a cyclone separator apparatus for separating solids from a gas-solid containing feed. The invention is also directed to the use of such a cyclone separator in a fluid catalytic cracking process (FCC process).

BACKGROUND OF THE INVENTION

A type of cyclone separator is described in U.S. Pat. No. 4,871,514. This patent publication describes a cyclone separator which is used in a fluid catalytic cracking process to separate catalyst from the gaseous hydrocarbon products. The cyclone separator has a dipleg which has at its lower end a flapper valve. Flapper valves are also referred to as trickle valves. In normal operation the valve is in a closed position and catalyst will accumulate in the dipleg until it reaches a predetermined height in the dipleg. At this predetermined height the weight of the catalyst above the flapper valve will overcome the biasing effect holding the valve closed so that the valve opens and catalyst is released from the dipleg. In normal operation this sequence of steps will continue to take place. EP-A-383523, EP-A-488607 and U.S. Pat. No. 4,446,107 are other publications describing cyclones having a dipleg and a trickle or flapper valve at the lower end of the dipleg.

A problem often encountered with these cyclones is that the dipleg is filled with catalyst while the flapper valve remains closed. When a diplex is clogged in such a fashion the cyclone will not function in an optimal manner as a solid-gas separator and the fluid catalytic cracking process will have to be shut down in order to overcome the clogging. Because FCC processes are expected to run many months and even years between planned shutdowns any unexpected shutdown will cause considerable economic damage.

The invention relates to a method for the selective catalytic oxidation of carbon monoxide (CO) comprising catalytically oxidizing carbon monoxide in $H_2$-rich, $CO_2$- and $H_2O$-containing gases in the presence of a noble metal catalyst on an $\alpha\text{-}Al_2O_3$ carrier with the addition of air as oxidizing agent. It would be advantageous to provide a cyclone separator having improved reliability, i.e. a separator which does not have the clogging problems as described above.

SUMMARY OF THE INVENTION

It has now been found that when the following apparatus is used less clogging of the dipleg will occur.

A cyclone separator apparatus for separating solids from a gas-solid containing feed resulting in a gas-rich stream, the cyclone separator comprising an upright hollow circular housing fluidly connected to a dipleg having at its lower end a flapper valve, wherein the dipleg has a lower part, which lower part has a diameter which increases from the top of the lower part to the lower end of the dipleg.

BRIEF DESCRIPTION OF THE DRAWING

The FIGURE represents a vertical cross section of the cyclone separator apparatus according to the invention.

DETAILED DESCRIPTION OF THE INVENTION

Figure 1:
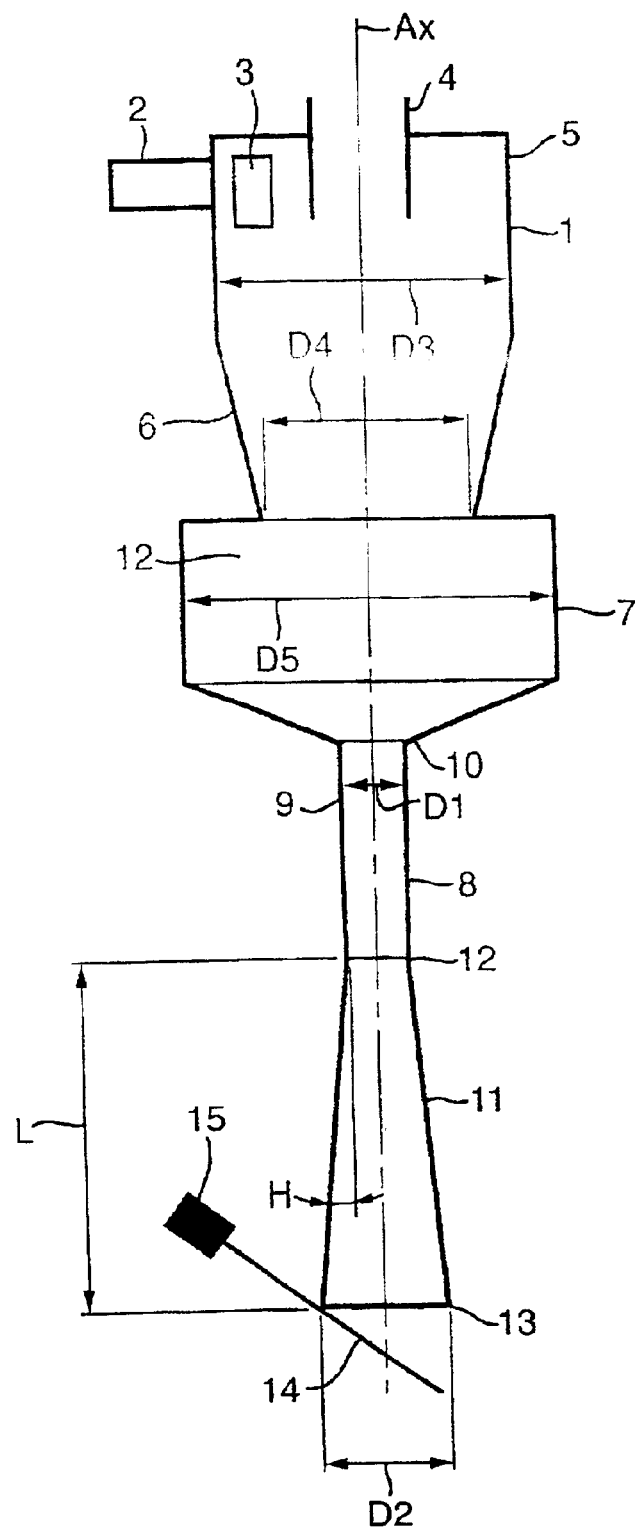

The cyclone separator according to the invention has an upright hollow circular housing. The diameter of the housing may vary and preferably the housing will have an upper part of constant diameter (D3) and a lower part of, suitably continuously, declining diameter resulting in a frusto conical form. Diameter D3 suitably has a dimension of between 0.5 and 3 meter. The diameter (D4) at the lower end of the housing is suitably about the diameter of the dipleg connected to said lower end. In another embodiment a dust chamber is present between the lower part of the housing and the upper part of the dipleg. Such a dust chamber has as a rule a larger diameter (D5) than the diameter (D1) of the top end of the dipleg. The dust chamber suitably has a conical formed bottom which allows the solids to flow towards the inlet of the dipleg. The diameter (D1) of the top end of the dipleg may be constant for obvious structural advantages and has suitably a value of between 0.05 and 0.3 meters. The various dimensions of the cyclone will depend on the required separation efficiency and feed characteristics and can be calculated by well known standards as described Pages 82–88 of Section 20 of Perry's Chemical Engineers' Handbook, Sixth edition, McGraw Hill 1984.

The cyclone separator according to the invention has a dipleg consisting of an upper part and a lower part, wherein the lower part has a diameter which increases from top of the lower part to the lower end of the dipleg. The length of the lower part will be referred to as 'L'. The length of the upper parts may be zero. Typical lengths (L) of the lower part are between about 0.1 and about 1.5 meters, and preferable between about 0.2 and about 1 meter.

The diameter of the lower part will preferably continuously increase from top of the lower part to the lower end of the dipleg. The angle (H) thus formed between the inner surface of the lower part of the dipleg and the vertical axis (Ax) is suitably between about 0.2° and about 4° and more preferably between about 0.5° and about 2°.

The lower end of the dipleg will consist of a flapper valve. The design of this flapper valve will partly depend on the design of the outlet opening of the dipleg. For example, the outlet opening of the dipleg may lie in a horizontal plane or in a vertical plane or in any plane between horizontal and vertical. Examples of possible designs which are associated with these possible openings are described in the afore mentioned publications EP-A-383523, EP-A-488607 and U.S. Pat. No. 4,446,107. Some designs for the outlet opening include some sort of bend of the dipleg at the lower end. Within the meaning of this invention the lower part of the dipleg is the vertically positioned lower part. This of course does not exclude that the non-vertical lower end part may not have some kind of tapered design. The invention is especially directed to diplegs which have only a vertical lower end, wherein the openings may lie in any plane as discussed above.

The invention is also directed to retrofitting an existing cyclone separator having a dipleg, preferably having the dimensions as described above but with a dipleg of constant diameter, by modifying the lower part of the dipleg in order to arrive at the cyclone separator according to this invention. The flapper valve may be of any one of the known designs.

The inlet means in a cyclone separator for the gas-solids feed are arranged in such a manner that, in use, a swirl movement in the tubular housing of the cyclone occurs. The swirl or rotating movement will cause the solids to be directed to the outer wall of the tubular housing where they slide down to be collected, optionally in a dust hopper From such a dust hopper the solids are withdrawn from the cyclone by means of the dipleg, also referred to as standpipe. The swirl movement can be obtained by an axial or tangential inlet of the feed. If the feed enters the cyclone axially, swirl imparting means will be present in the upper part of the tubular housing in order to impart on the downwardly moving feed a swirl or rotating movement.

The invention is also directed to a gas/solids separation process making use of the cyclone as described above, wherein a pressure difference exists between the cyclone housing and just beneath the outlet opening of the dipleg of between about 1000 Pa and about 40000 Pa, the solids preferably have a diameter ranging between about $1*10^{-6}$ m and about $200*10^{-6}$ m and wherein the solids are fluid catalytic catalysts of which the external surface consists predominately of a matrix material of the catalyst. Examples of possible matrix materials are clays, i.e. kaoline or metakaoline, alumina, silica, silica-alumina, magnesia, titania, zirconia and mixtures thereof. It has been found that when the cyclone separator according to the invention is used for this process less clogging occurs compared to when a cyclone having comparable dimensions but not having the tapered dipleg.

The cyclone separator according to the invention is preferably used in processes, preferably a fluid catalytic cracking process, where the dipleg of the cyclone is not easily inspected when the cyclone is in use. This is for example the situation in which the lower end of the dipleg is located within a vessel in which the separated solids are disposed in. Examples of such vessels in a fluid catalytic cracking process are reactor/stripping vessels, regenerator vessels and catalyst storage vessels.

A fluid catalytic cracking process generally comprises a reactor in which catalyst particles and gaseous hydrocarbons are contacted. The reactor is generally a vertically positioned tubular reactor often referred to as the riser reactor through which catalyst and reactants co-currently flow in an upwards direction. At the end of the riser the catalyst particles are separated from the reactor effluent. This separation is usually effected by means of one or more separation stages. The separated catalyst particles are collected in a stripping vessel. In this vessel the catalyst particles are stripped with a water containing gas to separate any hydrocarbons from the catalyst. Stripping is suitably performed in a fluidized bed wherein the stripping gas is used as the means to fluidize the catalyst particles. The stripped catalyst particles are subsequently sent to a regenerator vessel in which any coke is removed from the catalyst by means of combustion. The regenerator is suitably operated as a fluidized bed wherein the combustion gases, normally comprising oxygen, are used as means to fluidize the catalyst particles. The stripped and regenerated catalyst is reused in the process. In both stripping vessel and regenerator vessel the cyclone separator according to the invention may be suitably used.

In a preferred embodiment the cyclone separator according to the invention is used as a secondary cyclone to separate catalysts from the reactor riser effluent of a FCC process. In this embodiment the separation of catalyst from the reactor effluent is performed by means of a first separation which separates the bulk of the catalyst, followed by a secondary cyclone which separates most of the remaining catalyst particles. The first separator may be a cyclone or any other gas/solids separation means. Examples of such FCC configurations are described in the earlier cited patent publications U.S. Pat. Nos. 5,055,177, 5,391,289, EP-A-309244, EP-A-299650 and EP-A-275158.

In another preferred embodiment the cyclone separator according to the invention is used as a primary and especially as a secondary cyclone to separate FCC catalyst particles from the gaseous effluent of a FCC regenerator.

In the FIGURE a separator apparatus according the invention is shown having a hollow circular housing (1), symmetrical around an axis (Ax), fluidly connected to a dipleg (8) a gas outlet tube (4), inlet means (3) for the gas-solids feed, tangentially arranged to create, in use, a vortex flow in the circular housing (1). The inlet means (3) is fluidly connected to an inlet conduit (2). The circular housing (1) has upper tubular portion (5) with a diameter (D3), a frusto-conical envelope as a lower portion (6) of which smallest diameter (D4) is at the lower end and a dust chamber (7) having a diameter (D5). The dipleg (8) has an upper tubular part (9) of constant diameter (D1) connected to the dust chamber via the inlet (10) of the dipleg. A lower part (11) having a length (L) with diameter increasing from diameter (D1) at the top (12) of the lower part (11) to the diameter (D2) of the lower end (13) of this part (11). The angle (H) is formed by the wall of the tapered lower end and the axis (Ax). At the lower end (13) an opening which lies in the horizontal plane is shown connected to it a flapper valve (14). The flapper valve (14) is equipped with counter weight (15) and is shown in a partly opened position in FIG. 1.

The invention will be illustrated with the following non-limiting examples.

EXAMPLE 1

In a cyclone, equipped with a dipleg having a tapered lower part, a gas/FCC catalyst feed was separated in a solids rich bottom product and a solids poor gaseous product at room temperature. The cyclone had a dipleg of 4.5 m long (the dipleg-flow was made visible by using glass) and had further the dimensions as stated in Table 1. The dipleg-lower-end was located above a fluidized bed-level, and a horizontal counterweighted flapper-valve was present. The catalyst flux in the dipleg was 30 kg/m2s. The pressure difference between the cyclone and the exterior of the dipleg was 7000 Pa. The run was continued for more than 100 minutes and no clogging of the dipleg was observed. The example was repeated at lower pressure differences and no clogging of the dipleg was observed. Only when the pressure difference was increased to values exceeding 7000 Pa clogging was observed.

Comparative Experiment

Example 1 was repeated except that the lower part of the dipleg had a constant diameter. The pressure difference was 4500 Pa. It was observed that, even at these low pressure difference, the solids flow leaving the dipleg stopped within 10 minutes. The dipleg was completely filled with solids and the cyclone started to discharge catalyst particles through the top-outlet.

TABLE 1

| Parameter | reference | Dimension | Ex. 1 | Comp. Ex. A |
|---|---|---|---|---|
| Cyclone main diameter | D3 | mm | 320 | 320 |
| Dipleg-main diameter | D1 | mm | 80 | 80 |
| Dipleg-lower end diameter | D2 | mm | 94 | 80 |
| Diverging angle | H | ° | 1 | 0 |
| Length continuously diverging part | L | mm | 400 | 0 |

TABLE 1-continued

| Parameter | reference | Dimension | Ex. 1 | Comp. Ex. A |
|---|---|---|---|---|
| Catalyst Flux | | kg/m$^2$s | 30 | 30 |
| Pressure difference | dP | Pa | 7000 | >4500 |
| Catalyst mean particle size | | mm | 0.075 | 0.075 |
| Run-time | | minutes | >100 | <10 |

What is claimed is:

1. A cyclone separator apparatus for separating solids from a gas-solid containing feed resulting in a gas-rich stream, said separator comprising:
   an upright hollow circular housing comprising:
      an inner surface;
      an outer surface; and,
      a vertical axis;
   fluidly connected to a dipleg, said dipleg comprising:
      an upper part; and,
      a lower part comprising a lower end comprising a flapper valve;
   wherein the lower part of the dipleg has a diameter which increases along the lower part to the lower end of the dipleg.

2. The apparatus of claim 1, in which the diameter of the lower part increases continuously such that an angle formed by the inner surface of the lower part of the dipleg and the vertical axis is between about 0.2° and about 4°.

3. The apparatus of claim 2, in which the angle is between about 0.5° and about 2°.

4. A process for retrofitting an existing cyclone separator apparatus for separating solids from a gas-solid containing feed resulting in a gas-rich stream, said separator comprising a dipleg comprising:
   an upper part; and,
   a lower part comprising a lower end comprising a flapper valve;
   wherein the lower part of the dipleg has a diameter which remains constant along the lower part to the lower end of the dipleg;
   said process comprising:
      modifying the dipleg such that the diameter of the dipleg increases along the lower part to the lower end.

5. A process for separating gas from solids comprising: feeding a gas-solid containing stream into a cyclone separator apparatus, said apparatus comprising:
   an upright hollow circular housing comprising:
      an inner surface;
      an outer surface; and,
      vertical axis;
   fluidly connected to a dipleg, said dipleg comprising:
      an upper part; and,
      a lower part comprising a lower end comprising a flapper valve;
   wherein the lower part of the dipleg has a diameter which increases along the lower part to the lower end of the dipleg
   wherein a pressure difference exists between the cyclone housing and just beneath the lower end of the dipleg of between about 1000 Pa and about 40000 Pa;
   the solids have a diameter ranging between about $1*10^{-6}$ m and about $200*10^{-6}$ m; and,
   the solids comprise fluid catalytic catalysts.

6. The apparatus of claim 2, in which the lower end of the dipleg is located within a vessel in which the solids are disposed.

7. The process of claim 5, further comprising fluid catalytic cracking.

* * * * *